ANDREWS & GREEN
Corn-Planter.
No. 68,544.                    Patented Sept 3, 1867
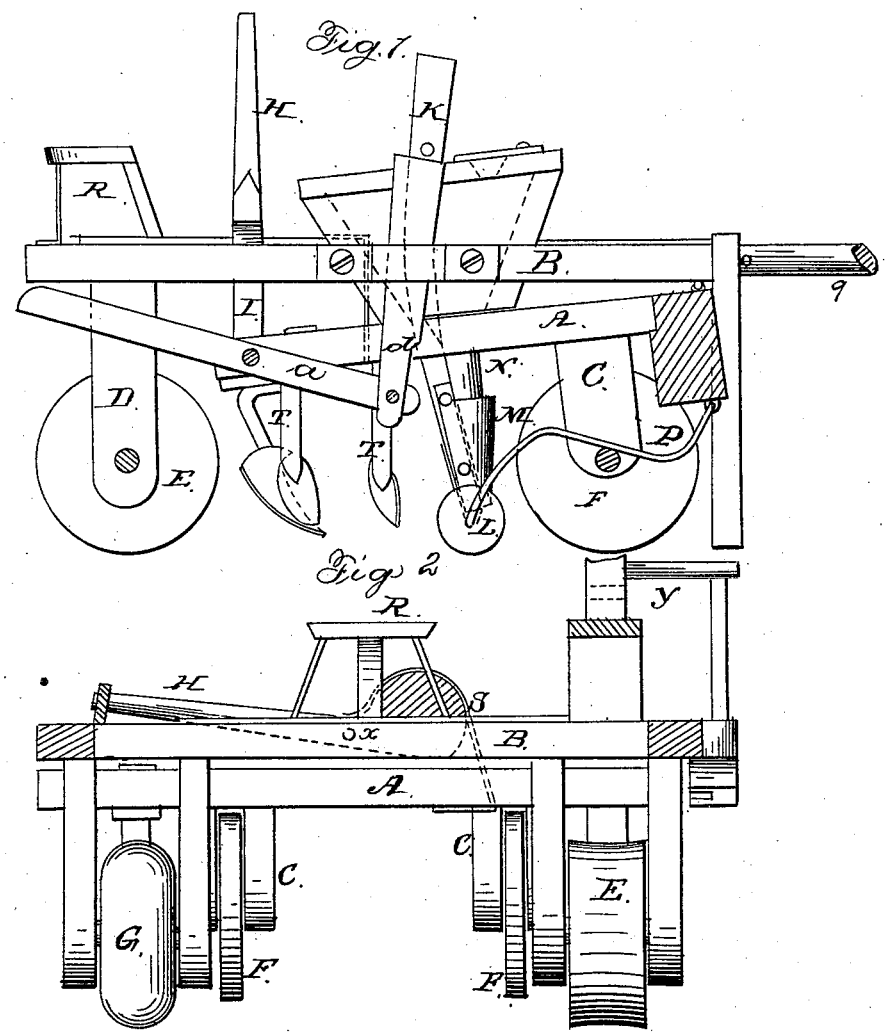
WITNESSES:
INVENTORS:

United States Patent Office.

J. K. ANDREWS AND J. DELOSS GREEN, OF ANTRIM, OHIO.

Letters Patent No. 68,544, dated September 3, 1867.

---

IMPROVEMENT IN CORN-PLANTERS.

---

The Schedule referred to in these Letters Patent and making part of the same.

---

TO ALL WHOM IT MAY CONCERN:

Be it known that we, J. K. ANDREWS and J. DELOSS GREEN, of Antrim, in the county of Guernsey, and in the State of Ohio, have invented certain new and useful improvements in Corn-Planters; and do hereby declare that the following is a full, clear, and exact description thereof, reference being had to the accompanying drawings, and to the letters of reference marked thereon.

In the annexed drawings, making part of this specification, A and B represent two frames, which are hinged together at their forward ends. These frames are provided with arms, C and D, which project from their under sides, and between these arms the wheels which carry the machine are placed, their shafts having their bearings in the said arms. The wheels F F of the frame A only serve the purpose of carrying the forward end of the machine, while the wheels of the frame B serve not only the purpose of carrying the rear end of the machine, but also serve to roll the furrow and pack the earth in a slight ridge over the seed after it has been dropped. One of these wheels, G, is made convex upon its periphery, while the other, E, is made concave, as seen. H represents a lever, which is pivoted at $x$ between two cross-bars of the upper frame B, and which has its lower end rounded off or made cam-shaped. This lever is connected at its lower end by means of a strap to the lower frame A, and is for the purpose of raising the rear end of said frame, said end dropping of its own gravity when relieved by the lever. The whole frame is raised some by this lever, and when this is the case the weight of the forward end of the machine is supported by the tongue bearing upon the neck-yoke. The lower frame is raised when it is desired to turn the machine around, or in conveying it from one portion of the field to another, or when not in use. J represents a seed-hopper, which is secured to the lower frame, but which passes up through an opening in the upper frame B. K represents a curved bar, which passes down through the seed-hopper, fitting snugly, but so that it will slide easily up and down in the bottom of the hopper. This bar has a recess formed in one side of it, which receives and carries out the grains of corn when the bar is made to play in the hopper. The lower end of bar K is secured to the axle of two roller-wheels L, which are intended, when the machine is working, to roll upon the earth. The axle of these rollers is braced to the forward end of the frame A in such a manner that the rollers are allowed to rise and fall with the inequalities of the ground. A part of a spout, N, is secured to the under side of the frame, and the part of one is secured to the bar K in such a manner as to receive and convey downward the seed as it is carried from the hopper. Two shanks T T, with suitable teeth upon their lower ends, are secured to the under side of frame A behind the rollers L, and their teeth answer the purpose of coverers for the grain. The wheel E rolls over and ridges the ground slightly after the seed has been dropped and covered. $a$ represents a lever, which is pivoted near its centre to frame A, and which has an upright bar, $d$, pivoted to it at its forward end. When the bar $d$ rises, its upper end strikes against a pin, $y$, in the upper end of bar K, and raises said bar, together with the rollers L, off of the ground. When the frame A is raised by lever H, the rear end of bar $a$ strikes under a portion of frame B, depressing it, or rather elevating its forward end, and with it of course the bar K, as has been set forth.

This machine is intended for planting corn in check-rows, which is done as follows: The ground is first laid off in one way, then the machine being put in dropping order is run crosswise of the first furrows. The rollers L running upon the ground drop into the cross-furrows. Whenever they drop into a furrow they carry the seed-slide downward until its grain-recess is outside and below the hopper. As soon as the recess passes below the hopper the corn falls from it and drops through tubes N and M into the furrow. When the rollers L rise out of the cross-furrow the seed-bar or slide K rises and receives another charge of grain. This operation is continued until the field is planted.

Having thus fully described our invention, what we claim as new, and desire to secure by Letters Patent, is—

1. The two frames A and B, hinged together as seen, and provided with the wheels F, E, and G, when used and operating as and for the purpose set forth.

2. The hopper J, bar K, and rollers L L, arranged and used with the frame A, as and for the purpose set forth.

3. The arrangement of the lever $a$, bar $d$, with the frames A and B and bar K, as and for the purpose specified.

4. The rollers L L, or their equivalents, used in the manner substantially as and for the purpose set forth.

In testimony that we claim the foregoing, we have hereunto set our hands this 30th day of May, 1867.

J. K. ANDREWS,
J. DELOSS GREEN.

Witnesses:
J. BORTON,
J. H. CRUMBACKER.